E. E. STANFIELD.
PAN LIFTER.
APPLICATION FILED JAN. 25, 1915.

1,227,849.

Patented May 29, 1917.

Witnesses
J. A. Ryan

Inventor
E. E. Stanfield
By
Attorney

UNITED STATES PATENT OFFICE.

EARL E. STANFIELD, OF DENVER, COLORADO.

PAN-LIFTER.

1,227,849.  Specification of Letters Patent.  Patented May 29, 1917.

Application filed January 25, 1915. Serial No. 4,300.

*To all whom it may concern:*

Be it known that I, EARL E. STANFIELD, a citizen of the United States, residing at Denver, in the county of Denver and State of Colorado, have invented certain new and useful Improvements in Pan-Lifters; and I do hereby declare the following to be a full, clear, and exact description of the invention, such as will enable others skilled in the art to which it appertains to make and use the same.

This invention relates to new and useful improvements in pan lifters, and has for its principal object to provide a pan lifter which is designed to provide a means whereby hot pans may be transferred or the position thereof changed without endangering the hands of the user.

Another object of the invention is to provide a device which is capable of being constructed of exceedingly cheap material and which may be formed at a minimum cost.

A further object of the invention is to provide a device which is capable of being sold at an exceedingly low price and for which there will be a great demand.

Figure 1:
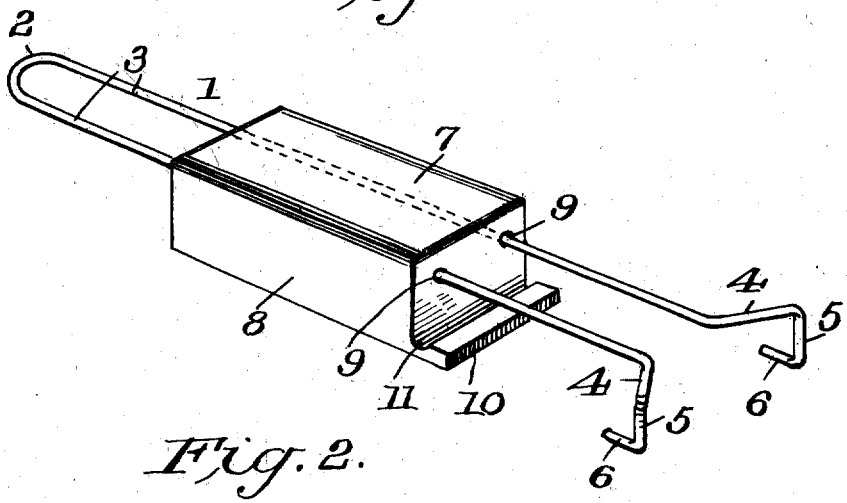
Figure 2:
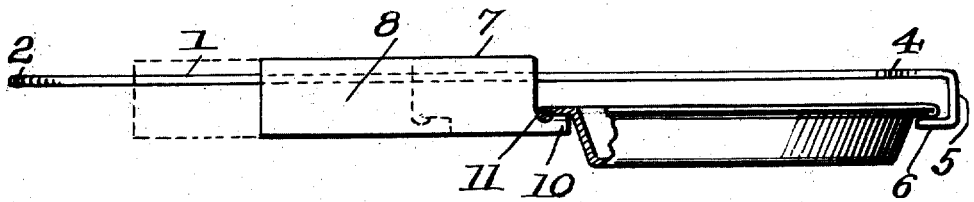
Figure 3:
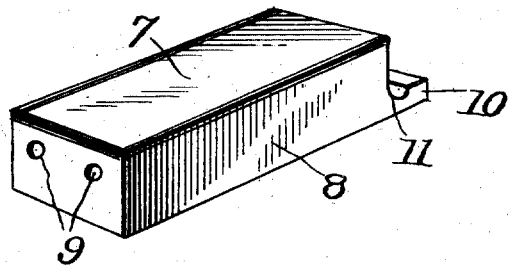

With these and other objects in view, the invention consists in the novel combination and arrangement of parts which will be fully set forth in the following specification and accompanying drawings, in which, Figure 1 illustrates a perspective view of a pan lifter constructed in accordance with this invention, Fig. 2 is a side view in elevation of Fig. 1 showing the pan in place, the said pan being partly in section to more clearly illustrate the method of use, and Fig. 3 is a perspective view of the slidable block.

Referring now to the drawings by characters of reference, the numeral 1 designates as an entirety the handle of the device comprising the bight portion 2 having formed thereon the parallel arms 3. These arms extend forwardly and are bent outwardly as at 4 and thence downwardly at right angles to their horizontal axis as at 5, and the lower ends of these downwardly extending portions are bent inwardly as at 6 to form the pan supporting projections as clearly shown in the drawings.

The non-heating relatively long block illustrated in Fig. 3 is designated generally by the numeral 7 and comprises the body 8 which is provided with a pair of parallel, longitudinally extending apertures 9 through which the parallel arms 3 extend. This block coöperates with the handle and forms a gripping element and is formed at its lower forward edge with the forwardly extending lip 10 having formed therein the transversely extending groove 11, in which the beaded edge of the pan which is being lifted, rests. Owing to the weight of the block and the frictional engagement of the handles 3 with the walls of the apertures 9 it will be apparent that accidental sliding movement of the block with relation to the article placed between the block and the arms will be eliminated. It is also apparent that due to the length and width of the block that the same may be readily grasped should the handle member 3 become heated during the action of handling pans or the like, thus preventing injury to the operator when in use.

From the foregoing it will be apparent that in use the handle is gripped in the hand of the user and the hooked ends of the arms 3 are then placed in such a position that they will engage the flange of the pan as clearly shown in Fig. 2. The gripping element or block 7 is then slid forwardly so that the tongue 10 engages beneath the flange of the pan and coöperates with the inward extension 6 in holding the pan in the proper position.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A pan lifter of the class described including a wire bent to form a U-shaped handle having the ends of its arms bent to provide L-shaped clamping arms, a rectangular non-heat-conducting block of a relatively long length provided near its upper side with a pair of longitudinally extending relatively spaced openings slidably and frictionally receiving the arms of the handle, said block being of sufficient length and width so as to prevent accidental sliding movement of the block on the arms, a lip formed on and extending forwardly from the lower front edge of said block, said lip having a transversely extending groove on its upper face defining a shoulder, said shoulder adapted to be positioned under the beaded edge of a pan forcing the same into the groove and eliminating any rearward movement of the block with relation to the arms of the pan when the pan is clamped between the arms and block, said block permitting the pan to be lifted thus obviating the necessity of the operator touching the wire handles.

In testimony whereof I affix my signature in presence of two witnesses.

EARL E. STANFIELD.

Witnesses:
 THOMAS O. LONG,
 G. T. LONG.